United States Patent
Raghavan et al.

(10) Patent No.: US 12,489,498 B1
(45) Date of Patent: Dec. 2, 2025

(54) DETERMINING OPTIMAL BEAM WEIGHTS TO BE USED OVER AN ANTENNA SUBSET

(71) Applicant: QUALCOMM Incorporated, San Diego, CA (US)

(72) Inventors: Vasanthan Raghavan, West Windsor Township, NJ (US); Sinan Adibelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 18/677,726

(22) Filed: May 29, 2024

(51) Int. Cl.
*H04B 7/06* (2006.01)

(52) U.S. Cl.
CPC ......... *H04B 7/0617* (2013.01); *H04B 7/0691* (2013.01)

(58) Field of Classification Search
CPC ............................ H04B 7/0617; H04B 7/0691
USPC ....................................................... 375/267
See application file for complete search history.

(56) References Cited

U.S. PATENT DOCUMENTS

| 11,750,267 B1* | 9/2023 | Raghavan | H04B 7/0857 375/347 |
| 2016/0359533 A1* | 12/2016 | Obara | H04B 7/0408 |

* cited by examiner

*Primary Examiner* — Fitwi Y Hailegiorgis
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE receives, from a network entity, a first set of reference signals associated with a first number of available antenna elements on the UE, and selects, based on the first set of reference signals, a second number of selected antenna elements from the first number of available antenna elements. The second number may be smaller than the first number. The UE further communicates data via the second number of the antenna elements based on a set of beam weights. The set of beam weights may be based on a second set of reference signals generated based on the second number of selected antenna elements.

20 Claims, 11 Drawing Sheets

DETERMINING OPTIMAL BEAM WEIGHTS TO BE USED OVER AN ANTENNA SUBSET

TECHNICAL FIELD

The present disclosure relates generally to communication systems and, more particularly, to methods and apparatus for determining beam weights to be used over an antenna subset of a given set of antennas in wireless communications applications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to receive, from a network entity, a first set of reference signals associated with a first number of available antenna elements on the UE; select, based on the first set of reference signals, a second number of selected antenna elements from the first number of available antenna elements, where the second number is smaller than the first number; and communicate data via the second number of the antenna elements based on a set of beam weights. The set of beam weights may be based on a second set of reference signals generated based on the second number of selected antenna elements.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to transmit, to a UE, a first set of reference signals associated with a first number of available antenna elements on the UE; transmit, to the UE, a second set of reference signals generated based on a second number of selected antenna elements, where the second number is less than the first number; and communicate data via the second number of the antenna elements based on a set of beam weights. The set of beam weights may be based on the second set of reference signals.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
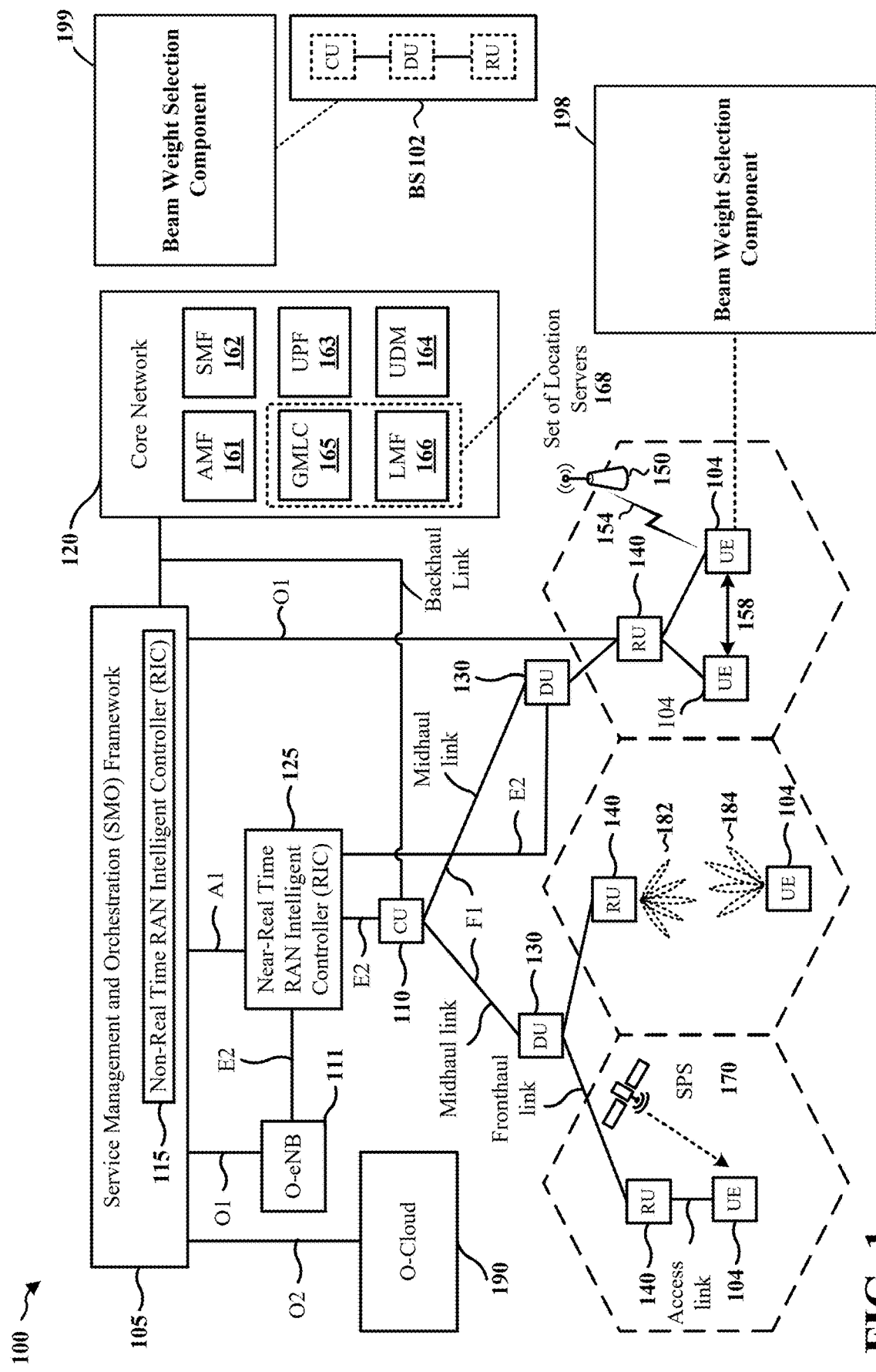
FIG. 1 is a diagram illustrating an example of a wireless communication system and an access network.

In wireless communication, user equipment (UE) may have multiple antenna modules, each including several antenna elements, for transmission and reception of communication signals to ensure robust coverage and resilience against signal blockage. As wireless technology advances, particularly with the adoption of millimeter wave and higher frequency bands, the capability to include more antenna elements within each antenna module has increased. Each antenna element may have its own power amplifier (PA), low-noise amplifier (LNA) and phase shifter, leading to increased power consumption, especially at millimeter wave frequencies and beyond. Hence, a proper selection of antenna elements and effective beam weight training for the selected antenna elements are important for reliable and efficient communication at these higher frequencies. However, traditional analog beamforming, which relies on a codebook-based method for beam weight selection for antenna elements, is less effective due to factors such as hand/body blockages and wider angular spreads of clusters through which propagation happens in these scenarios. Additionally, beam training methods that involve exploring all possible combinations of transmit and receive beams are becoming increasingly impractical because of their high computational complexity. Aspects presented herein provide more efficient strategies for selecting antenna elements and conducting beam weight training for the selected antenna elements.

Various aspects relate generally to wireless communication. Some aspects more specifically relate to methods and apparatus for determining beam weights over an antenna subset in wireless communication. In some examples, a UE receives, from a network entity, a first set of reference signals associated with a first number of available antenna elements on the UE; and selects, based on the first set of reference signals, a second number of selected antenna elements from the first number of available antenna elements. The second number may be smaller than the first number. The UE further communicates data via the second number of the antenna elements based on a set of beam weights. The set of beam weights may be based on a second set of reference signals generated based on the second number of selected antenna elements. In some examples, the UE may first estimate a first covariance matrix associated with the first number of available antenna elements based on the first set of reference signals. The UE may then select the second number of selected antenna elements based on the first covariance matrix.

Particular aspects of the subject matter described in this disclosure can be implemented to realize one or more of the following potential advantages. In some examples, by employing a multi-step approach for selecting antenna elements and beam weights, the described techniques can be used to reduce power consumption and computational overhead while improving signal quality in complex environments. In some examples, by using an eigenvector-based procedure to select a subset of antenna elements from all available antenna elements, the described techniques enable a more informed selection of the optimal subset antenna elements, which helps in identifying the most suitable antennas for the current conditions without exhaustive testing of all possible combinations.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include the beam weight selection component 198. The beam weight selection component 198 may be configured to receive, from a network entity, a first set of reference signals associated with a first number of available antenna elements on the UE; select, based on the first set of reference signals, a second number of selected antenna elements from the first number of available antenna elements, where the second number is smaller than the first number; and communicate data via the second number of the antenna elements based on a set of beam weights. The set of beam weights is based on a second set of reference signals generated based on the second number of selected antenna elements. In certain aspects, the base station 102 may include the beam weight selection component 199. The beam weight selection component 199 may be configured to transmit, to a UE, a first set of reference signals associated with a first number of available antenna elements on the UE; transmit, to the UE, a second set of reference signals generated based on a second number of selected antenna elements, where the second number is less than the first number; and communicate data via the second number of the antenna elements based on a set of beam weights. The set of beam weights may be based on the second set of reference signals. Although the following description may be focused on 5G NR, the concepts described herein may be applicable to other similar areas, such as LTE, LTE-A, CDMA, GSM, and other wireless technologies.

Figure 2:
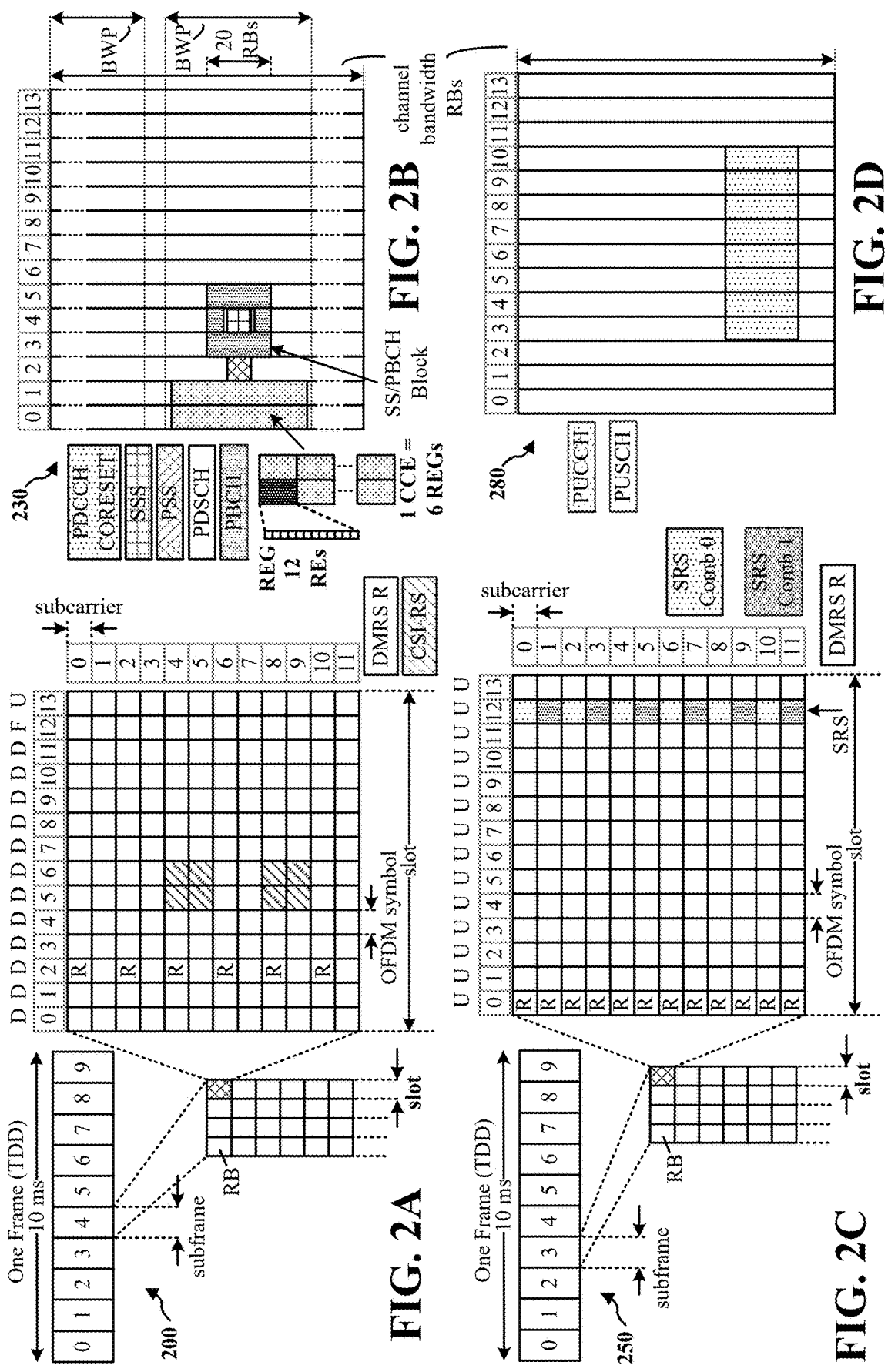
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
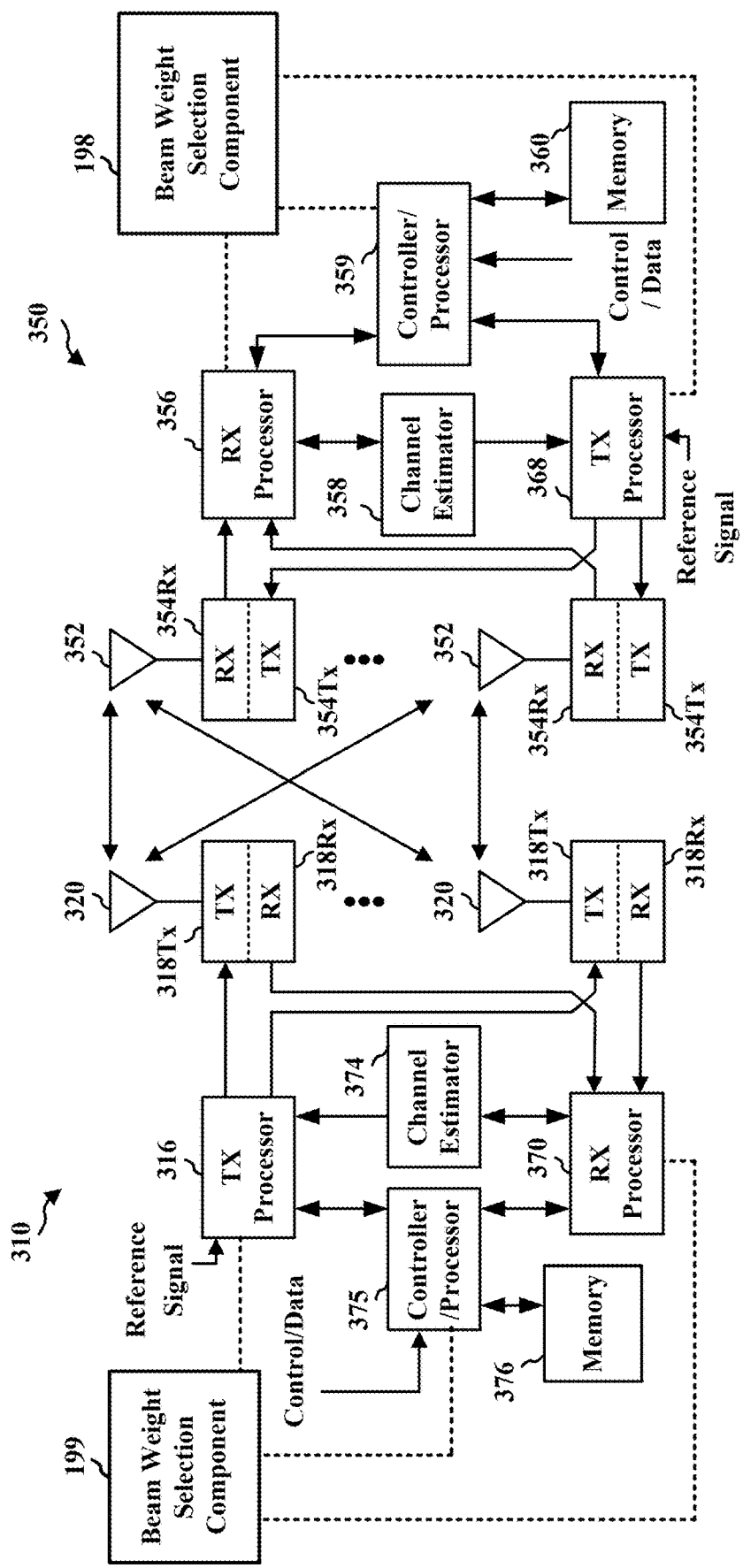
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam weight selection component 198 of FIG. 1.

At least one of the TX processor 316, the RX processor 370, and the controller/processor 375 may be configured to perform aspects in connection with the beam weight selection component 199 of FIG. 1.

Example aspects presented herein provide methods and apparatus to determine beam weights for a power-saving and/or network energy saving beamforming configuration, where some of the antennas may not be selected (or turned on). In some aspects, these methods may be based on a two-stage process, where the antenna selection process is performed in the first stage, and the antenna weights for the selected set are determined in the second stage.

In wireless communication, analog beamforming directs the transmission and reception of communication signals in specific directions. This technique can enhance signal quality and extend the communication range. For example, effective beamforming may increase link margins (e.g., the surplus signal strength or power beyond what is necessary to maintain communication quality). A user equipment (UE) may incorporate multiple antenna modules, each including several antenna elements. These antenna modules may be strategically placed to ensure robust coverage and resilience against signal blockage. As the use of millimeter wave and higher frequency bands expands, more antenna elements (e.g., up to eight antenna elements per module) may be incorporated into an antenna module. In some scenarios, two antenna modules may be placed adjacent to each other, enabling the coherent combining of signals at the intermediate frequency (IF) or baseband level. As higher carrier frequencies, such as 60 GHz and 140 GHz, become broadly relevant, more antenna elements may be supported within the same aperture (e.g., the physical size or area of the antenna module).

However, as each antenna element may have its own power amplifier (PA), low-noise amplifier (LNA), and phase shifter, the increased number of antenna elements leads to increased power consumption, especially at millimeter wave frequencies and beyond. At these higher frequencies, effective beam weight training for the selected set of antenna elements is an important aspect of antenna selection. Traditional analog beamforming, which relies on a codebook-based method for beam weight selection for antenna elements, may be less effective due to factors such as blockages and wider angular spreads, and beam training methods that involve exploring all possible combinations of phase shifter values and/or gain settings of PAs/LNAs are becoming increasingly impractical because of their high computational complexity.

Example aspects presented herein provide more efficient strategies for selecting antenna elements and conducting beam weight training for the selected antenna elements. In some aspects, the beam weight training may be conducted in coordination with a network entity, such as a base station.

In some examples, a downlink channel matrix over the k-th subcarrier may be presented as H(k), which may be an N×M matrix, where N denotes the maximum number of possible antenna elements at the UE side, and M denotes the antenna elements at the network side (e.g., the gNB side). In some examples, a matrix h(k) may be defined as:

$$h(k) = H(k)f = [h_1(k) \ldots h_N(k)]^T \quad (1)$$

where h(k) has a size of N×1, and f represents the M×1 beamformer on the network side (e.g., the gNB side). The reference signal received power (RSRP) can be expressed as:

$$RSRP = \sum_k |g^H h(k)|^2 = g^H \cdot \left(\sum_k h(k)h(k)^H\right) \cdot g \quad (2)$$

That is, the RSRP, as a function of g, may lead to an estimate of the channel covariance matrix R as observed at the UE side as:

$$R = \sum_k h(k)h(k)^H \quad (3)$$

By performing measurements with multiple candidate beams, denoted as $(g_1, g_2, \ldots g_{3N-2})$, an estimate of the covariance matrix R may be obtained, and its dominant eigenvector may be computed and used as the beam weights for beamforming purposes. This method for computing the beam weights may improve the performance compared to a directional codebook-based approach. For example, this method may be useful in various scenarios in the FR2 frequency range, such as with hand or body blockage, where the phases across antenna elements may be impaired, or small cell indoor hotspots, where wider angular spreads may occur.

The computational overhead of the method using Equations (1)-(3) may be determined by the number of reference signals (RSs) needed to estimate the covariance matrix R, which may increase with the size of the antenna array or the number of antenna elements (N). While N may represent the largest set of antenna elements that may be used at the UE side, power and thermal constraints may necessitate using fewer antenna elements. Hence, an optimal beam weight design tailored to a selected subset of antenna elements (e.g., K<N) is desired.

In some aspects, the selection and optimization of antenna elements may be constrained by power and thermal overheads at the device (e.g., UE), which often limit the number of active antenna elements to K out of a possible N. However, the optimal set of K antenna elements may be unknown, and there may be a large number of possible combinations (e.g., $^NC_K$), by which K antenna elements may be selected from N possible antenna elements. For example, selecting 2 out of 8 antenna elements has 28 combinations ($^8C_2$=28), while selecting 4 out of 8 possible antenna elements has 70 possible combinations ($^8C_4$=70). The numbers of possible combinations increase significantly as the number of possible elements increases. For example, selecting 4 out of 16 possible antenna elements has 1820 possible combinations ($^{16}C_4$=1820), and selecting 8 out of 16 possible antenna elements has 12,870 combinations ($^{16}C_8$=12870).

Once a set of K antenna elements, denoted as $(\pi_1, \pi_2, \ldots, \pi_K)$, has been selected with $$h_\Pi(k) = \begin{bmatrix} h_{\pi_1}(k) \\ \vdots \\ h_{\pi_K}(k) \end{bmatrix} \quad (4)$$

The adaptive beam weights associated with $h_\Pi(k)$ may be estimated. Note that k denotes the subcarrier index in Equation (4). The estimation of the adaptive beam weights may be based on the estimation of the covariance matrix (e.g., $R_\Pi$) associated with the K selected antenna elements. $R_\Pi$, however, may not be directly derived from the covariance matrix (e.g., R) for the full set of antenna elements. In some examples, the covariance matrix of size K×K may be estimated using a set of reference signals with the number of reference signals proportional to K (e.g., 3K–2).

Figure 4:
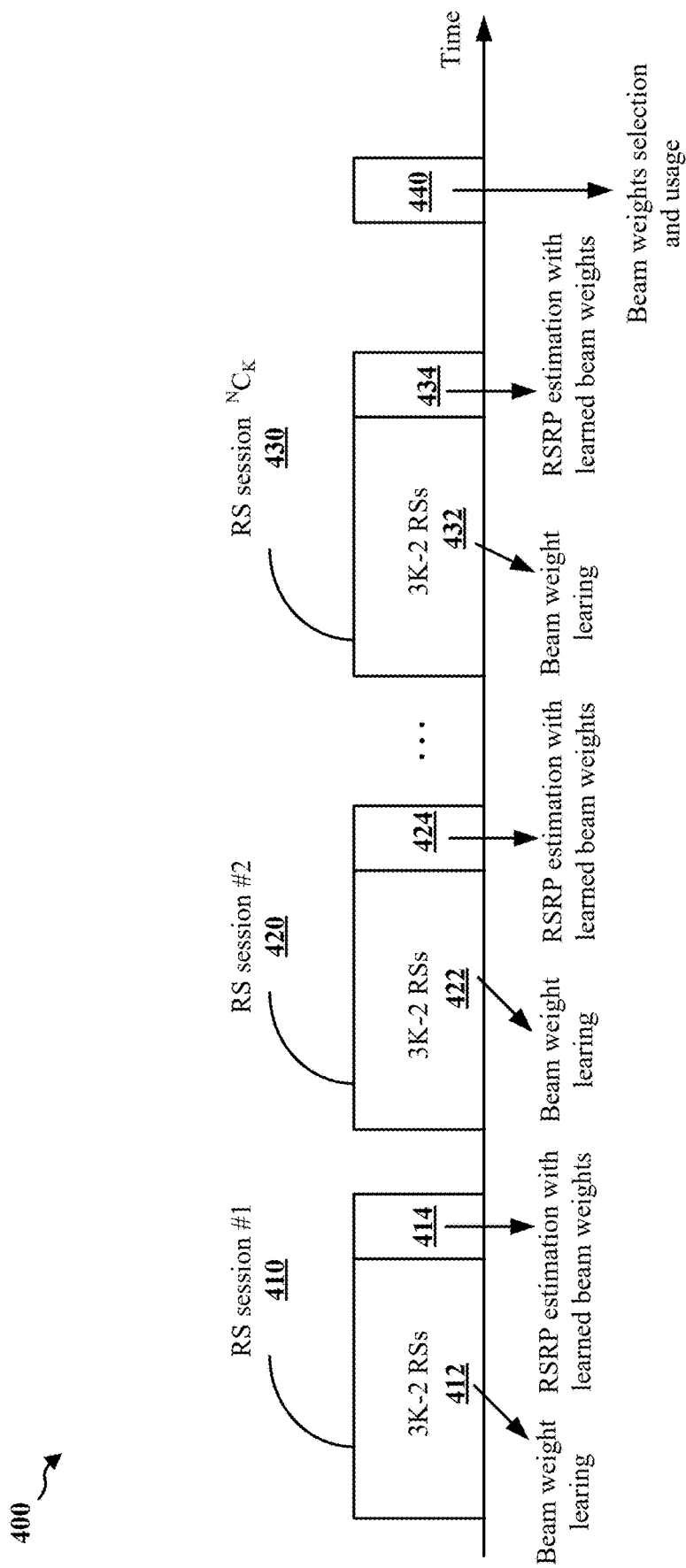
FIG. 4 is a diagram illustrating an example of a beam weight learning process.

FIG. 4 is a diagram 400 illustrating an example of a beam weight learning process. As shown in FIG. 4, for each possible selection of K antenna elements, the UE may perform beam weight learning based on a set of reference signals (e.g., 3K–2 reference signals) and estimate the RSRP based on the learned beam weights. For example, for the first set of K selected antenna elements, at RS session #1 410, the UE may use 3K–2 reference signals for beam weights learning for the first set of K selected antenna elements (e.g., at 412) and estimate the RSRP based on the learned beam weights at 414. Similarly, for the second set of K selected antenna elements, at RS session #2 420, the UE may use 3K–2 reference signals for beam weight learning for the second set of K selected antenna elements (e.g., at 422) and estimate the RSRP based on the learned beam weights at 424. Since there are $^NC_K$ possible combinations of K selected antenna elements, the UE may perform beam weight learning and RSRP estimation for each of these $^NC_K$ possible combinations, all the way to the beam weight learning (e.g., at 432) and RSRP estimation (e.g., at 434) for the last RS session NCK 430. Then, the UE may select the best set of beam weights based on the learned beam weights at these $^NC_K$ RS sessions (e.g., from 410 to 430) and use the selected beam weights for communication (e.g., at 440). The beam weight learning process depicted in FIG. 4 may be referred to as the exhaustive search method. As shown in FIG. 4, this exhaustive search method has large signaling and computational overheads, as it involves $^NC_K \times (3K-2)$ reference signals and the computation of $^NC_K$ eigenvectors corresponding to $^NC_K$ K×K matrices.

Figure 5:
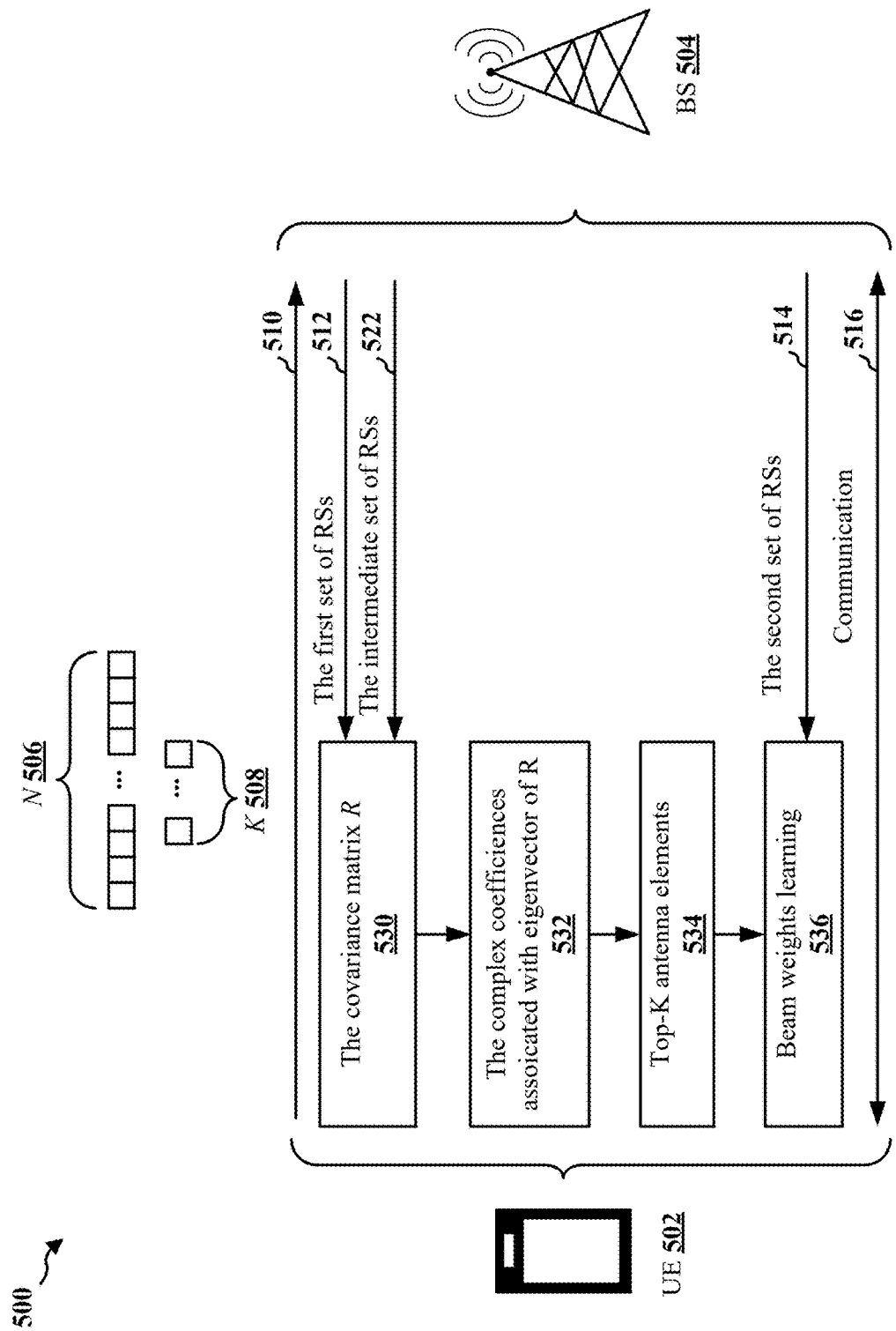
FIG. 5 is a diagram illustrating an example of the multi-step method for selecting antenna elements and beam weights in accordance with various aspects of the present disclosure.

Example aspects provide a multi-step (e.g., two-step) approach for selecting antenna elements and beam weights. FIG. 5 is a diagram 500 illustrating an example of the multi-step method for selecting antenna elements and beam weights in accordance with various aspects of the present disclosure. In some aspects, in the multi-step approach, the UE 502 may first indicate, at 510, to the network (e.g., a base station 504) the total number of antenna elements that are available (e.g., N 506) and the number of antenna elements to be selected (e.g., K 508) from these available antenna elements to optimize device performance (e.g., to optimize the power and thermal overhead).

Following the UE's indication at 510, the network (e.g., the base station 504) may allocate, at 512, a first set of reference signals associated with all N antenna elements for the learning of the eigenvectors. For example, the network (e.g., the base station 504) may transmit the first set of reference signals over the physical downlink shared channel (PDSCH) beams, allowing the UE 502 to determine the covariance matrix (e.g., R) associated with all N antenna elements (e.g., at 530). For example, the UE 502 may determine the covariance matrix (e.g., R) using the RSRP on the reference signals according to the description in connection to Equations (2) and (3). Then, the UE 502 may, at 532, estimate the dominant eigenvector of the covariance matrix (e.g., R), identifying the complex coefficients (denoted as: $u_1, \ldots, u_N$) associated with this eigenvector. Based on these coefficients (e.g., based on the magnitudes of these coefficients), the UE 502 may select, at 534, the top K antenna elements from the N possible antenna elements. For example, the UE may select the K antenna elements based on the K largest complex coefficients (in terms of their magnitudes). That is, the UE may select $\pi_1, \ldots, \pi_K$ such that $$|u_{\pi_1}| \geq \ldots \geq |u_{\pi_k}| \geq \ldots \geq |u_{\pi_K}|.$$

In some aspects, after the K antenna elements have been identified, the network (e.g., the base station 504) may transmit, at 514, a second set of reference signals, with the selected set (e.g., K) of antenna elements for eigenvector and beam weight learning. The second set of reference signals may be generated in consequence of the selection (at 534) of the selected set (e.g., K) of antenna elements. For example, the UE 502 may, at 536, perform the eigenvector and beam weight learning according to the description in connection to Equations (2) and (3). Then, the UE 502 and the network (e.g., the base station 504) may, at 516, communicate data using the beam weights determined at 536.

Figure 6:
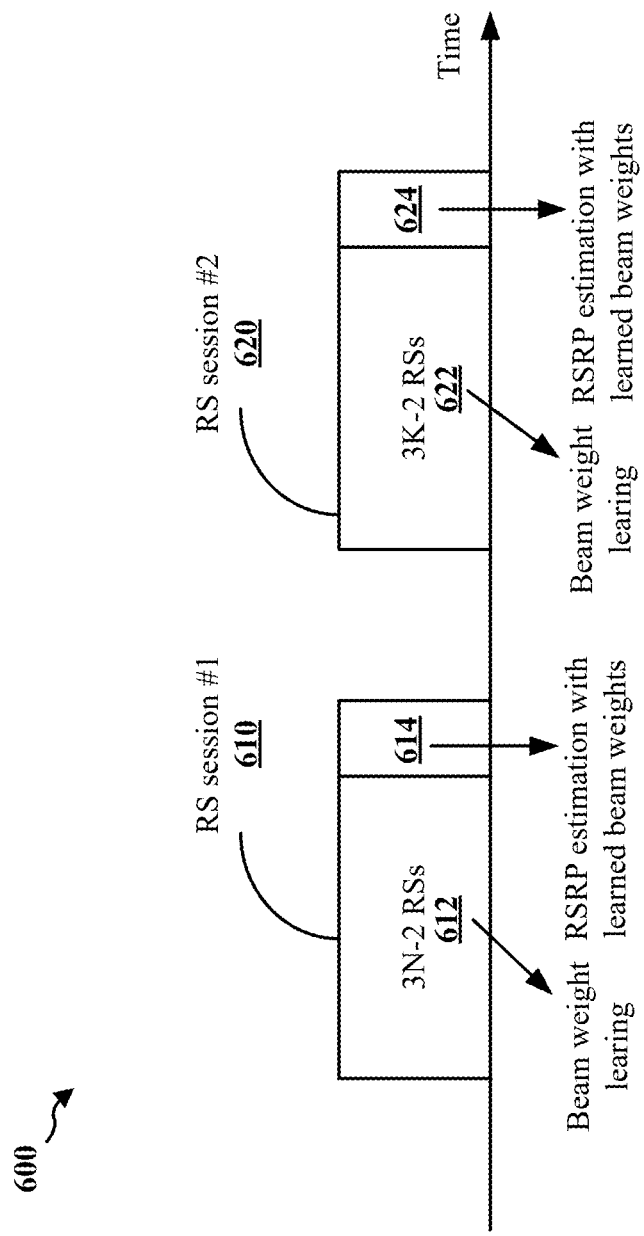
FIG. 6 is a diagram illustrating an example of the multi-step method for antenna element selection and beam weight learning in accordance with various aspects of the present disclosure.

FIG. 6 is a diagram 600 illustrating an example of the multi-step method for antenna element selection and beam weight learning in accordance with various aspects of the present disclosure. As shown in FIG. 6, in the first step (e.g., at RS session #1 610), the UE may use a set of 3N−2 reference signals for beam weights learning for the set of N antenna elements (e.g., at 612), and estimate the RSRP based on the learned beam weights at 614. Then, based on the estimated RSRP, the UE may estimate the covariance matrix according to the description in connection with Equations (2) and (3). The UE may then select K antenna elements from the N antenna elements. For example, the UE may select K antenna elements based on the top K (e.g., in terms of magnitudes) complex coefficients associated with the eigenvector of the covariance matrix. In the second step (e.g., at RS session #2 620), the UE may perform beam weight learning (e.g., at 622) for the K selected antenna elements and estimate the RSRP based on the learned beam weight at 624. As shown in FIG. 6, this multi-step method for antenna element selection and beam weight learning may significantly reduce the signaling and computational overheads compared to the method depicted in FIG. 4. The network may transmit 3N−2 reference signals for the first step (e.g., at 612) and 3K−2 reference signals for the second step (e.g., at 622) (compared to $^N C_K \times (3K-2)$ reference signals in FIG. 4), and the UE may estimate two eigenvectors (compared to $^N C_K$ eigenvectors in FIG. 4): one for the N×N covariance matrix and another for the K×K covariance matrix. Table 2 shows the comparison of signaling and computational overheads of different methods for beam weight learning.

TABLE 2

Signaling and computational overheads for beam weights learning

| | Exhaustive search method | Multi-step method |
|---|---|---|
| Reference signal overhead | $^N C_K \times (3K-2)$ | 3N-2 (for the first set of reference signals) and 3K-2 (for the second set of reference signals) |

TABLE 2-continued

Signaling and computational overheads for beam weights learning

| | Exhaustive search method | Multi-step method |
|---|---|---|
| Computational overhead | $^N C_K$ eigenvectors of K × K matrices | 1 eigenvector of an N × N matrix, and 1 eigenvector of a K × K matrix |

In some aspects, the entire 3N−2 reference signals for learning the covariance matrix (e.g., R) are not necessarily to be fully allocated or granted. Instead, the number of reference signals to be allocated or granted may be proportional to the actual number of the available antenna array (or antenna elements). For example, if the actual number of the available antenna elements is M (e.g., M<N), the number of reference signals to be allocated or granted may be proportional to M (instead of N).

In some aspects, when the network transmits the second set of reference signals for eigenvector and beam weight learning (e.g., at 514), the number of reference signals in the second set of reference signals to be allocated or granted may be proportional to the indicated reduced array size (e.g., K) after antenna selection has occurred.

In some aspects, the UE may estimate the covariance matrix (e.g., R) associated with an intermediate size (e.g., $N_1$) of antenna elements, where $N > N_1 > K$. The intermediate size (e.g., $N_1$) of antenna elements may include all potential antenna elements out of which the UE may search for the K selected antenna elements. In some examples, the UE may indicate the intermediate size (e.g., $N_1$) to the network (e.g., a base station or gNB). In some examples, the UE may indicate the intermediate size (e.g., $N_1$) instead of the number of all possible antenna elements (e.g., N). In some examples, the network may transmit a set of intermediate reference signals to the UE, and the UE may estimate the covariance matrix associated with the intermediate number of antenna elements. For example, referring to FIG. 5, the UE 502 may estimate the covariance matrix (e.g., at 530) based on an intermediate set of reference signals. The intermediate set of reference signals may be transmitted by the base station 504 at 522, and may be associated with the intermediate number of antenna elements. The UE may further select the K selected antenna elements from the intermediate number of antenna elements based on the covariance matrix.

Figure 7:
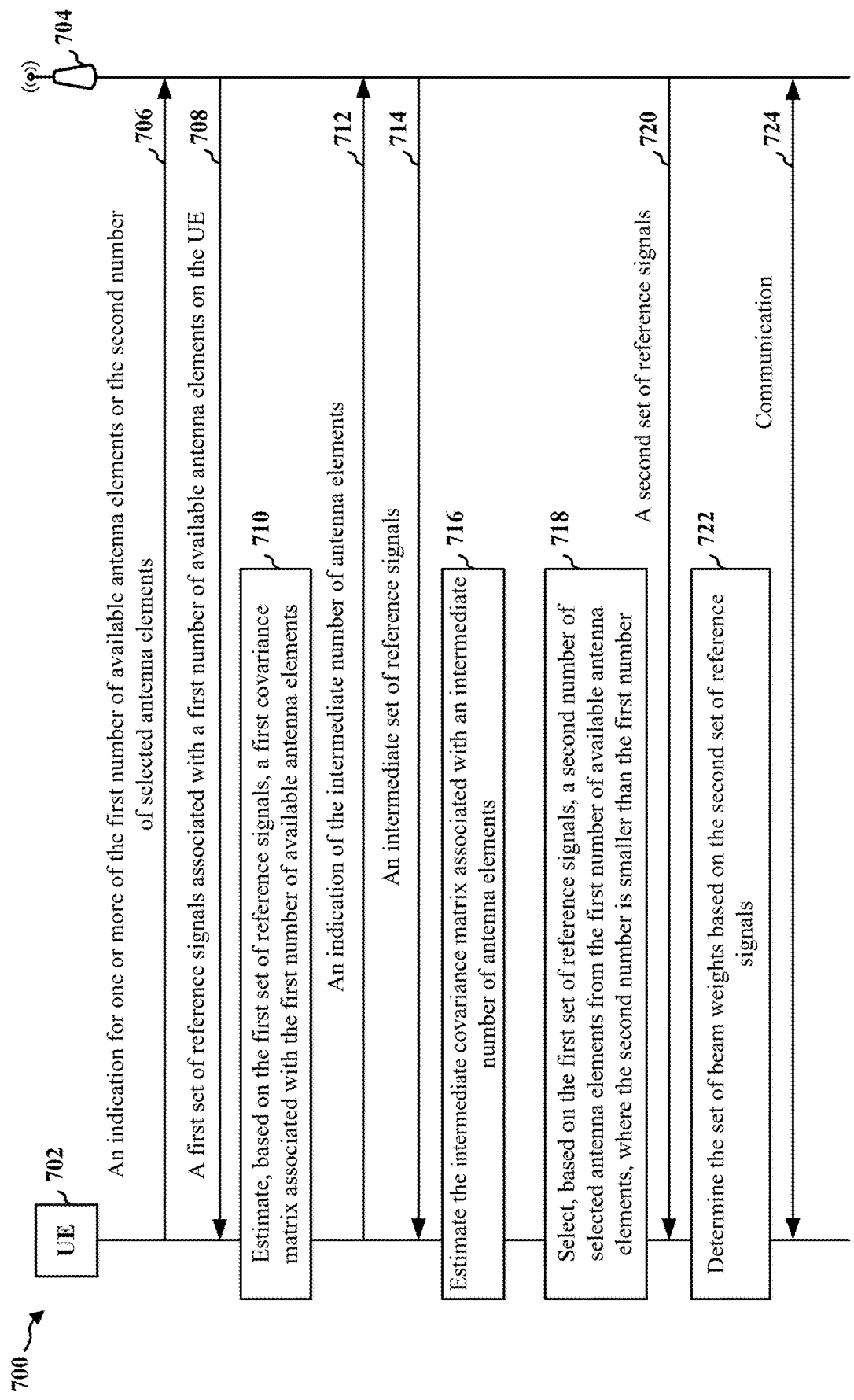
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Various aspects are described in connection with a UE 702 and a base station 704. The aspects may be performed by the UE 702 or the base station 704 in aggregation and/or by one or more components of a base station 704 (e.g., a CU 110, a DU 130, and/or an RU 140).

As shown in FIG. 7, at 706, the UE 702 may transmit, to base station 704, an indication for one or more of the first number of available antenna elements or the second number of selected antenna elements on the UE 702. For example, referring to FIG. 5, the UE 502 may transmit, at 510, to base station 504, an indication for one or more of the number of available antenna elements (e.g., N 506) or the number of selected antenna elements (e.g., K 508).

At 708, the UE 702 may receive, from base station 704, a first set of reference signals associated with the first number of available antenna elements on the UE 702. For example, referring to FIG. 5, the UE 502 may, at 512, receive, from base station 504, a first set of reference signals associated with the first number of available antenna elements.

At 710, the UE 702 may estimate, based on the first set of reference signals, a first covariance matrix associated with the first number of available antenna elements. For example, referring to FIG. 5, the UE 502 may, at 530, estimate, based on the first set of reference signals, a first covariance matrix associated with the first number of available antenna elements. For example, the UE may estimate the covariance matrix according to the description in connection with Equations (2) and (3).

In some examples, at 712, the UE 702 may further transmit, for base station 704, an indication of the intermediate number of antenna elements. The intermediate number may be less than the first number. For example, the intermediate number of antenna elements may include all potential antenna elements out of which the UE may search for the K selected antenna elements.

In some examples, at 714, the UE 702 may receive, from base station 704, an intermediate set of reference signals. In some examples, the number of reference signals in the intermediate set of reference signals may be proportional to the intermediate number. For example, referring to FIG. 5, the UE 502 may receive, at 522, from base station 504, an intermediate set of reference signals.

In some examples, at 716, the UE 702 may estimate the intermediate covariance matrix associated with the intermediate number of antenna elements based on the intermediate set of reference signals. For example, referring to FIG. 5, the UE 502 may, at 530, estimate the intermediate covariance matrix associated with the intermediate number of antenna elements based on the intermediate set of reference signals (e.g., at 522).

At 718, the UE 702 may select, based on the first set of reference signals, a second number of selected antenna elements from the first number of available antenna elements. The second number may be smaller than the first number. In some examples, when the intermediate set of reference signals was sent to the UE 702 (e.g., at 714), the UE 702 may select the second number of selected antenna elements from the intermediate number of antenna elements.

At 720, the UE 702 may receive a second set of reference signals generated based on the second number of selected antenna elements from base station 704. For example, referring to FIG. 5, the UE 502 may, at 514, receive a second set of reference signals from base station 504. In some examples, the second set of reference signals may be generated based on the selection of the second number of selected antenna elements (e.g., the selection of top K antenna elements at 534). In some examples, the number of reference signals in the second set of reference signals may be proportional to the second number. Referring to FIG. 6, the UE may receive 3K−2 reference signals (e.g., 622) for beam weight learning.

At 722, the UE 702 may determine the set of beam weights based on the second set of reference signals generated based on the second number of selected antenna elements. For example, referring to FIG. 6, the UE may determine the set of beam weights (e.g., at 622) based on a set of 3K−2 reference signals.

At 724, the UE 702 may communicate data with base station 704 via the second number of the antenna elements based on the set of beam weights. The set of beam weights may be based on the second set of reference signals generated based on the second number of selected antenna elements (e.g., at 720).

Figure 8:
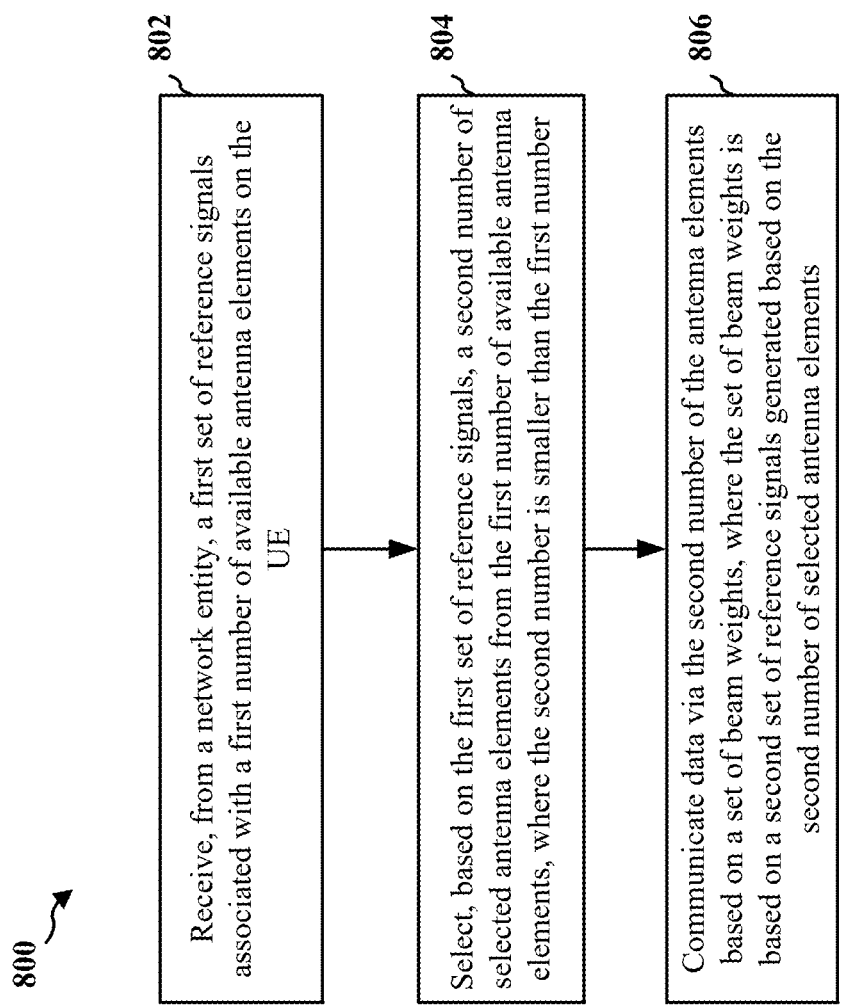
FIG. 8 is a flowchart illustrating methods of wireless communication at a UE in accordance with various aspects of the present disclosure.

FIG. 8 is a flowchart 800 illustrating methods of wireless communication at a UE in accordance with various aspects of the present disclosure. The method may be performed by a UE. The UE may be the UE 104, 350, 502, 702, or the apparatus 1004 in the hardware implementation of FIG. 10. By employing a multi-step approach for selecting antenna elements and beam weights, the methods reduce power consumption and computational overhead while improving signal quality in complex environments. Additionally, by using an eigenvector-based procedure to select a subset of antenna elements from all available antenna elements, the methods enable a more informed selection of the optimal subset antenna elements, which helps in identifying the most suitable antennas for the current conditions without exhaustive testing of all possible combinations.

As shown in FIG. 8, at 802, the UE may receive, from a network entity, a first set of reference signals associated with a first number of available antenna elements on the UE. The network entity may be a base station, or a component of a base station, in the access network of FIG. 1 or a core network component (e.g., base station 102, 310, 504, 704; or the network entity 1002 in the hardware implementation of FIG. 10). FIG. 5, FIG. 6, and FIG. 7 illustrate various aspects of the steps in connection with flowchart 800. For example, referring to FIG. 7, the UE 702 may, at 708, receive, from a network entity (base station 704), a first set of reference signals associated with a first number of available antenna elements on the UE. Referring to FIG. 5, the UE 502 may, at 512, receive, from base station 504, a first set of reference signals associated with the first number of available antenna elements. Referring to FIG. 6, the UE may receive 3N−2 reference signals at 612. In some aspects, 802 may be performed by the beam weight selection component 198.

At 804, the UE may select, based on the first set of reference signals, a second number of selected antenna elements from the first number of available antenna elements. The second number may be smaller than the first number. For example, referring to FIG. 7, the UE 702 may, at 718, select, based on the first set of reference signals, a second number of selected antenna elements from the first number of available antenna elements. Referring to FIG. 5, the UE 702 may, at 534, select the second number of selected antenna elements (e.g., top K antenna elements) from the first number of available antenna elements. In some aspects, 804 may be performed by the beam weight selection component 198.

At 806, the UE may communicate data via the second number of the antenna elements based on a set of beam weights. The set of beam weights may be based on a second set of reference signals generated based on the second number of selected antenna elements. For example, referring to FIG. 7, the UE 702 may, at 724, communicate data via the second number of the antenna elements based on a set of beam weights. Referring to FIG. 6, the set of beam weights may be determined based on the second set of reference signals (e.g., 3K−2 reference signals at 622). Referring to FIG. 5, the UE 502 may, at 516, communicate data with the base station 504 via the second number of the antenna elements based on a set of beam weights learned at 536. In some aspects, 806 may be performed by the beam weight selection component 198.

In some aspects, the UE may transmit, to the network entity, an indication for one or more of the first number of available antenna elements or the second number of selected antenna elements. For example, referring to FIG. 7, the UE 702 may, at 706, transmit to the network entity (base station 704) an indication for one or more of the first number of available antenna elements or the second number of selected antenna elements. Referring to FIG. 5, the UE 502 may transmit, at 510, to base station 504, an indication for one or more of the number of available antenna elements (e.g., N 506) or the number of selected antenna elements (e.g., K 508).

In some aspects, the UE may estimate, based on the first set of reference signals, a first covariance matrix associated with the first number of available antenna elements. To select the second number of selected antenna elements (at 804), the UE may select, based on the first covariance matrix, the second number of selected antenna elements. For example, referring to FIG. 7, the UE 702 may, at 710, estimate, based on the first set of reference signals, a first covariance matrix associated with the first number of available antenna elements. Referring to FIG. 5, the UE 502 may, at 530, estimate, based on the first set of reference signals (e.g., at 512), covariance matrix R associated with the first number of available antenna elements. For example, the UE may estimate the covariance matrix R according to the description in connection with Equations (2) and (3).

In some aspects, to select, based on the first covariance matrix, the second number of selected antenna elements, the UE may determine, based on the first covariance matrix, a first eigenvector; and select, based on one or more coefficients associated with the first eigenvector, the second number of selected antenna elements. For example, the UE may select the second number of selected antenna elements (e.g., K selected antenna elements) based on one or more coefficients (e.g., the K largest coefficients (in terms of magnitude)) associated with the first eigenvector.

In some aspects, to select the second number of selected antenna elements (at 804), the UE may identify, based on the magnitude of each of the one or more coefficients, the second number of coefficients from the one or more coefficients; and select, based on the second number of coefficients, the second number of selected antenna elements. For example, the UE may identify the second number of coefficients having the largest magnitudes from the one or more coefficients; and select, based on the second number of coefficients, the second number of selected antenna elements.

In some aspects, the UE may determine the set of beam weights based on the second set of reference signals generated based on the second number of selected antenna elements. The communication of the data (e.g., at 806) may be based on the determined set of beam weights. For example, referring to FIG. 7, the UE 702 may, at 722, determine the set of beam weights based on the second set of reference signals generated based on the second number of selected antenna elements. Referring to FIG. 6, the UE may determine the set of beam weights (e.g., at 622) based on a set of 3K−2 reference signals.

In some aspects, to determine the set of beam weights, the UE may estimate, based on the second set of reference signals, a second covariance matrix associated with the second number of selected antenna elements; compute a second eigenvector of the second covariance matrix; and determine, based on the second eigenvector of the second covariance matrix, the set of beam weights. For example, to determine the set of beam weights, the UE may estimate, based on the second set of reference signals, a second covariance matrix associated with the second number (e.g., K) of selected antenna elements based on Equation (3). The UE may compute a second eigenvector of the second covariance matrix (e.g., a matrix having a size of K×K); and determine, based on the second eigenvector of the second covariance matrix (e.g., a matrix having a size of K×K), the set of beam weights.

In some aspects, the first number of reference signals in the first set of reference signals may be proportional to the first number. For example, referring to FIG. 6, the first set of reference signals may include 3N−2 reference signals (e.g., at 612), which is proportional to the first number (e.g., N).

In some aspects, the second number of reference signals in the second set of reference signals may be proportional to the second number. For example, referring to FIG. 6, the second set of reference signals may include 3K−2 reference signals, which is proportional to the second number (e.g., K).

In some aspects, the UE may estimate the intermediate covariance matrix associated with an intermediate number of antenna elements. The intermediate number may be greater than the second number and less than the first number. To select the second number of selected antenna elements from the first number of available antenna elements (e.g., at 802), the UE may select the second number of selected antenna elements from the intermediate number of antenna elements. For example, referring to FIG. 7, the UE 702 may, at 716, estimate the intermediate covariance matrix associated with an intermediate number of antenna elements. The intermediate number may be greater than the second number and less than the first number. To select the second number of selected antenna elements from the first number of available antenna elements (e.g., at 718), the UE 702 may select the second number of selected antenna elements from the intermediate number of antenna elements. Referring to FIG. 5, the UE 502 may, at 530, estimate the intermediate covariance matrix associated with the intermediate number of antenna elements based on the intermediate set of reference signals (e.g., at 522).

In some aspects, the UE may transmit, for the network entity, an indication of the intermediate number of antenna elements. For example, referring to FIG. 7, the UE 702 may, at 712, transmit, for the network entity (base station 704), an indication of the intermediate number of antenna elements.

In some aspects, the UE may receive, for the network entity, an intermediate set of reference signals. The UE may estimate, based on the intermediate set of reference signals, the covariance matrix associated with the intermediate number of antenna elements. For example, referring to FIG. 7, the UE 702 may, at 714, receive, for the network entity (base station 704), an intermediate set of reference signals. Referring to FIG. 5, the UE 502 may receive, at 522, from base station 504, an intermediate set of reference signals. The UE 502 may estimate, at 530, based on the intermediate set of reference signals (at 522), the covariance matrix associated with the intermediate number of antenna elements.

Figure 9:
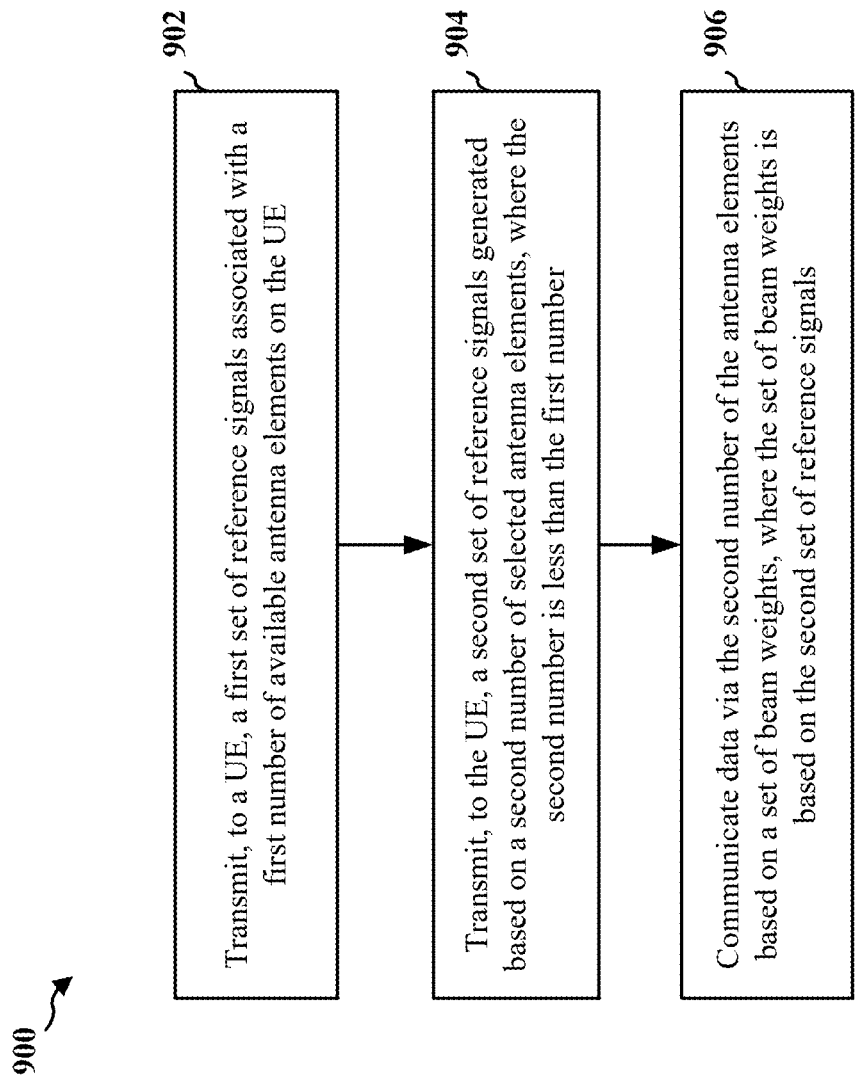
FIG. 9 is a flowchart illustrating methods of wireless communication at a network entity in accordance with various aspects of the present disclosure.

FIG. 9 is a flowchart 900 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 504, 704; or the network entity 1002 in the hardware implementation of FIG. 10). By employing a multi-step approach for selecting antenna elements and beam weights, the methods reduce power consumption and computational overhead while improving signal quality in complex environments. Additionally, by using an eigenvector-based procedure to select a subset of antenna elements from all available antenna elements, the methods enable a more informed selection of the optimal subset antenna elements, which helps in identifying the most suitable antennas for the current conditions without exhaustive testing of all possible combinations.

As shown in FIG. 9, at 902, the network entity may transmit, to a UE, a first set of reference signals associated with a first number of available antenna elements on the UE. The UE may be the UE 104, 350, 502, 702, or the apparatus 1004 in the hardware implementation of FIG. 10. FIG. 5, FIG. 6, and FIG. 7 illustrate various aspects of the steps in connection with flowchart 900. For example, referring to FIG. 7, the network entity (base station 704) may, at 708, transmit, to a UE 702, a first set of reference signals associated with a first number of available antenna elements on the UE. Referring to FIG. 5, the base station 504 may, at 512, transmit to UE 502, a first set of reference signals associated with the first number (e.g., N 506) of available antenna elements. In some aspects, 902 may be performed by the beam weight selection component 199.

At 904, the network entity may transmit, to the UE, a second set of reference signals generated based on a second number of selected antenna elements. The second number may be less than the first number. For example, referring to FIG. 7, the network entity (base station 704) may, at 720, transmit, to the UE 702, a second set of reference signals generated based on a second number of selected antenna elements. Referring to FIG. 5, the network entity (base station 504) may, at 514, transmit, to the UE 502, a second set of reference signals generated based on a second number (e.g., K 508) of selected antenna elements. The second number (e.g., K 508) may be less than the first number (e.g., N 506). In some aspects, 904 may be performed by the beam weight selection component 199.

At 906, the network entity may communicate data via the second number of the antenna elements based on a set of beam weights. The set of beam weights may be based on the second set of reference signals. For example, referring to FIG. 7, the network entity (base station 704) may, at 724, communicate data with UE 702 via the second number of the antenna elements based on a set of beam weights. In some aspects, 906 may be performed by the beam weight selection component 199.

In some aspects, the network entity may receive, from the UE, an indication for one or more of the first number of available antenna elements or the second number of selected antenna elements. For example, referring to FIG. 7, the network entity (base station 704) may receive, at 706, from the UE 702, an indication for one or more of the first number of available antenna elements or the second number of selected antenna elements. Referring to FIG. 5, the network entity (base station 504) may receive, at 510, from the UE 502, an indication for one or more of the first number (e.g., N 506) of available antenna elements or the second number (e.g., K 508) of selected antenna elements.

In some aspects, the network entity may receive, from the UE, an indication of an intermediate number of antenna elements. The intermediate number may be less than the first number and greater than the second number. The network entity may further transmit, for the UE, an intermediate set of reference signals. For example, referring to FIG. 7, the network entity (base station 704) may, at 712, receive, from the UE 702, an indication of an intermediate number of antenna elements. The intermediate number may be less than the first number and greater than the second number. The network entity (base station 704) may further, at 714, transmit, for the UE 702, an intermediate set of reference signals.

Figure 10:
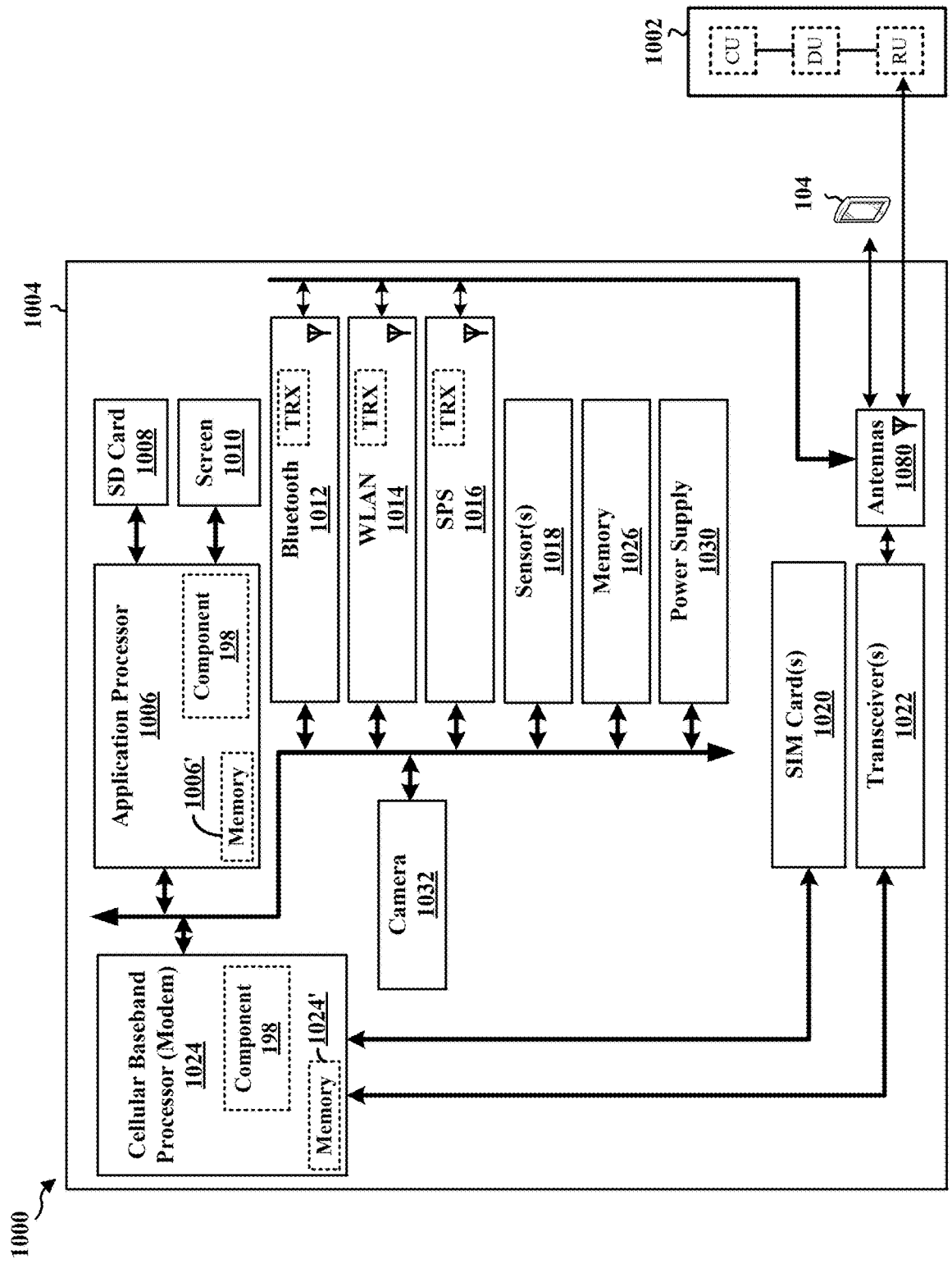
FIG. 10 is a diagram illustrating an example of a hardware implementation for an example apparatus and/or UE.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor (or processing circuitry) 1024 (also referred to as a modem) coupled to one or more transceivers 1022 (e.g., cellular RF transceiver). The cellular baseband processor(s) (or processing circuitry) 1024 may include at least one on-chip memory (or memory circuitry) 1024'. In some aspects, the apparatus 1004 may further include one or more subscriber identity modules (SIM) cards 1020 and at least one application processor (or processing circuitry) 1006 coupled to a secure digital (SD) card 1008 and a screen 1010. The application processor(s) (or processing circuitry) 1006 may include on-chip memory (or memory circuitry) 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor(s) (or processing circuitry) 1024 communicates through the transceiver(s) 1022 via one or more antennas 1080 with the UE 104 and/or with an RU associated with a network entity 1002. The cellular baseband processor(s) (or processing circuitry) 1024 and the application processor(s) (or processing circuitry) 1006 may each include a computer-readable medium/memory (or memory circuitry) 1024', 1006', respectively. The additional memory modules 1026 may also be considered a computer-readable medium/memory (or memory circuitry). Each computer-readable medium/memory (or memory circuitry) 1024', 1006', 1026 may be non-transitory. The cellular baseband processor(s) (or processing circuitry) 1024 and the application processor(s) (or processing circuitry) 1006 are each responsible for general processing, including the execution of software stored on the computer-readable medium/memory (or memory circuitry). The software, when executed by the cellular baseband processor(s) (or processing circuitry) 1024/application processor(s) (or processing circuitry) 1006, causes the cellular baseband processor(s) (or processing circuitry) 1024/application processor(s) (or processing circuitry) 1006 to perform the various functions described supra. The cellular baseband processor(s) (or processing circuitry) 1024 and the application processor(s) (or processing circuitry) 1006 are configured to perform the various functions described supra based at least in part of the information stored in the memory (or memory circuitry). That is, the cellular baseband processor(s) (or processing circuitry) 1024 and the application processor(s) (or processing circuitry) 1006 may be configured to perform a first subset of the various functions described supra without information stored in the memory and may be configured to perform a second subset of the various functions described supra based on the information stored in the memory. The computer-readable medium/memory (or memory circuitry)

may also be used for storing data that is manipulated by the cellular baseband processor(s) (or processing circuitry) 1024/application processor(s) (or processing circuitry) 1006 when executing software. The cellular baseband processor(s) (or processing circuitry) 1024/application processor(s) (or processing circuitry) 1006 may be a component of the UE 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor(s) (or processing circuitry) 1024 and/or the application processor(s) (or processing circuitry) 1006, and in another configuration, the apparatus 1004 may be the entire UE (e.g., see UE 350 of FIG. 3) and include the additional modules of the apparatus 1004.

As discussed supra, the component 198 may be configured to receive, from a network entity, a first set of reference signals associated with a first number of available antenna elements on the UE; select, based on the first set of reference signals, a second number of selected antenna elements from the first number of available antenna elements, where the second number is smaller than the first number; and communicate data via the second number of the antenna elements based on a set of beam weights, where the set of beam weights is based on a second set of reference signals generated based on the second number of selected antenna elements. The component 198 may be further configured to perform any of the aspects described in connection with the flowchart in FIG. 8, and/or performed by the UE 702 in FIG. 7. The component 198 may be within the cellular baseband processor(s) (or processing circuitry) 1024, the application processor(s) (or processing circuitry) 1006, or both the cellular baseband processor(s) (or processing circuitry) 1024 and the application processor(s) (or processing circuitry) 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) (or processing circuitry) 1024 and/or the application processor(s) (or processing circuitry) 1006, includes means for receiving, from a network entity, a first set of reference signals associated with a first number of available antenna elements on the UE, means for selecting, based on the first set of reference signals, a second number of selected antenna elements from the first number of available antenna elements, where the second number is smaller than the first number, and means for communicating data via the second number of the antenna elements based on a set of beam weights, where the set of beam weights is based on a second set of reference signals generated based on the second number of selected antenna elements. The apparatus 1004 may further include means for performing any of the aspects described in connection with the flowchart in FIG. 8, and/or aspects performed by the UE 702 in FIG. 7. The means may be the component 198 of the apparatus 1004 configured to perform the functions recited by the means. As described supra, the apparatus 1004 may include the TX processor 368, the RX processor 356, and the controller/processor 359.

As such, in one configuration, the means may be the TX processor 368, the RX processor 356, and/or the controller/processor 359 configured to perform the functions recited by the means.

Figure 11:
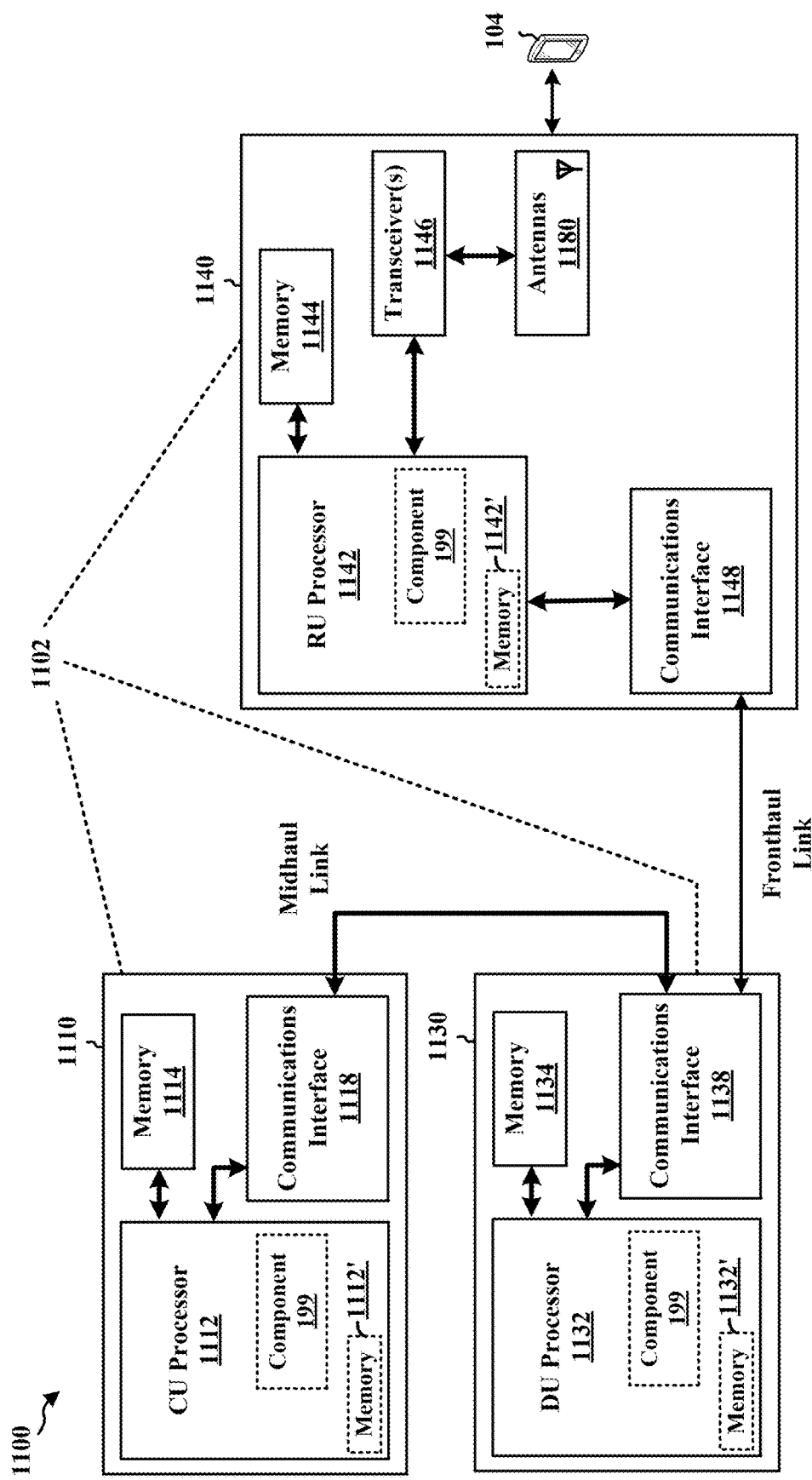
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include at least one CU processor (or processing circuitry) 1112. The CU processor(s) (or processing circuitry) 1112 may include on-chip memory (or memory circuitry) 1112'. In some aspects, the CU 1110 may further include additional memory modules 1114 and a communications interface 1118. The CU 1110 communicates with the DU 1130 through a midhaul link, such as an F1 interface. The DU 1130 may include at least one DU processor (or processing circuitry) 1132. The DU processor(s) (or processing circuitry) 1132 may include on-chip memory (or memory circuitry) 1132'. In some aspects, the DU 1130 may further include additional memory modules 1134 and a communications interface 1138. The DU 1130 communicates with the RU 1140 through a fronthaul link. The RU 1140 may include at least one RU processor (or processing circuitry) 1142. The RU processor(s) (or processing circuitry) 1142 may include on-chip memory (or memory circuitry) 1142'. In some aspects, the RU 1140 may further include additional memory modules 1144, one or more transceivers 1146, antennas 1180, and a communications interface 1148. The RU 1140 communicates with the UE 104. The on-chip memory (or memory circuitry) 1112', 1132', 1142' and the additional memory modules 1114, 1134, 1144 may each be considered a computer-readable medium/memory (or memory circuitry). Each computer-readable medium/memory (or memory circuitry) may be non-transitory. Each of the processors (or processing circuitry) 1112, 1132, 1142 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to transmit, to a UE, a first set of reference signals associated with a first number of available antenna elements on the UE; transmit, to the UE, a second set of reference signals generated based on a second number of selected antenna elements, where the second number is less than the first number; and communicate data via the second number of the antenna elements based on a set of beam weights, where the set of beam weights is based on the second set of reference signals. The component 199 may be further configured to perform any of the aspects described in connection with the flowchart in FIG. 9, and/or performed by the base station 704 in FIG. 7. The component 199 may be within one or more processors (or processing circuitry) of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1102 may include a variety of components configured for various functions. In one configuration, the network entity 1102 includes means for transmitting, to a UE, a first set of reference signals associated with a first number of available antenna elements on the UE, means for transmitting, to the UE, a second set of reference signals generated based on a second number of selected antenna elements, where the second number is less than the first number, and means for communicating data via the second number of the antenna elements based on a set of beam weights, where the set of beam weights is based on the second set of reference signals. The network entity 1102 may further include means for performing any of the aspects described in connection with the flowchart in FIG. 9, and/or aspects performed by the base station 704 in FIG. 7. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving, from a network entity, a first set of reference signals associated with a first number of available antenna elements on the UE; selecting, based on the first set of reference signals, a second number of selected antenna elements from the first number of available antenna elements, where the second number is smaller than the first number; and communicating data via the second number of the antenna elements based on a set of beam weights, where the set of beam weights is based on a second set of reference signals generated based on the second number of selected antenna elements. By employing a multi-step approach for selecting antenna elements and beam weights, the methods reduce power consumption and computational overhead while improving signal quality in complex environments. Additionally, by using an eigenvector-based procedure to select a subset of antenna elements from all available antenna elements, the methods enable a more informed selection of the optimal subset antenna elements, which helps in identifying the most suitable antennas for the current conditions without exhaustive testing of all possible combinations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving, from a network entity, a first set of reference signals associated with a first number of available antenna elements on the UE; selecting, based on the first set of reference signals, a second number of selected antenna elements from the first number of available antenna elements, wherein the second number is smaller than the first number; and communicating data via the second number of the antenna elements based on a set of beam weights, wherein the set of beam weights is based on a second set of reference signals generated based on the second number of selected antenna elements.

Aspect 2 is the method of aspect 1, where the method further includes transmitting, to the network entity, an indication for one or more of the first number of available antenna elements or the second number of selected antenna elements.

Aspect 3 is the method of any of aspects 1 to 2, where the method further includes estimating, based on the first set of reference signals, a first covariance matrix associated with the first number of available antenna elements, and selecting the second number of selected antenna elements comprises: selecting, based on the first covariance matrix, the second number of selected antenna elements.

Aspect 4 is the method of aspect 3, wherein selecting, based on the first covariance matrix, the second number of selected antenna elements comprises determining, based on the first covariance matrix, a first eigenvector; and selecting, based on one or more coefficients associated with the first eigenvector, the second number of selected antenna elements.

Aspect 5 is the method of aspect 4, wherein selecting the second number of selected antenna elements comprises: identifying, based on a magnitude of each of the one or more coefficients, the second number of coefficients from the one or more coefficients; and selecting, based on the second number of coefficients, the second number of selected antenna elements.

Aspect 6 is the method of any of aspects 1 to 5, where the method further includes determining the set of beam weights based on the second set of reference signals, wherein the communication of the data is based on the determined set of beam weights.

Aspect 7 is the method of aspect 6, wherein determining the set of beam weights comprises: estimating, based on the second set of reference signals, a second covariance matrix associated with the second number of selected antenna elements; computing a second eigenvector of the second covariance matrix; and determining, based on the second eigenvector of the second covariance matrix, the set of beam weights.

Aspect 8 is the method of any of aspects 1 to 7, wherein a first number of reference signals in the first set of reference signals is proportional to the first number.

Aspect 9 is the method of any of aspects 1 to 7, wherein a second number of reference signals in the second set of reference signals is proportional to the second number.

Aspect 10 is the method of aspect 1, where the method further includes estimating an intermediate covariance matrix associated with an intermediate number of antenna elements, wherein the intermediate number is greater than the second number and less than the first number, and selecting the second number of selected antenna elements from the first number of available antenna elements comprises selecting the second number of selected antenna elements from the intermediate number of antenna elements.

Aspect 11 is the method of aspect 10, where the method further includes transmitting, for the network entity, an indication of the intermediate number of antenna elements.

Aspect 12 is the method of aspect 11, where the method further includes receiving, for the network entity, an intermediate set of reference signals, wherein estimating the intermediate covariance matrix associated with the intermediate number of antenna elements comprises: estimating, based on the intermediate set of reference signals, the intermediate covariance matrix associated with the intermediate number of antenna elements.

Aspect 13 is an apparatus for wireless communication at a UE, comprising: a processing system that includes processor circuitry and memory circuitry that stores code and is coupled with the processor circuitry, the processing system configured to cause the UE to perform the method of one or more of aspects 1-12.

Aspect 14 is an apparatus for wireless communication at a UE, comprising: at least one memory; and at least one processor coupled to the at least one memory and, where the at least one processor, individually or in any combination, is configured to perform the method of any of aspects 1-12.

Aspect 15 is the apparatus for wireless communication at a UE, comprising means for performing each step in the method of any of aspects 1-12.

Aspect 16 is an apparatus of any of aspects 13-15, further comprising a transceiver configured to receive or to transmit in association with the method of any of aspects 1-12.

Aspect 17 is a computer-readable medium (e.g., a non-transitory computer-readable medium) storing computer executable code at a UE, the code when executed by at least one processor causes the at least one processor to, individually or in any combination, perform the method of any of aspects 1-12.

Aspect 18 is a method of wireless communication at a network entity. The method includes transmitting, to a user equipment (UE), a first set of reference signals associated with a first number of available antenna elements on the UE; transmitting, to the UE, a second set of reference signals generated based on a second number of selected antenna elements, wherein the second number is less than the first number; and communicating data via the second number of the antenna elements based on a set of beam weights, wherein the set of beam weights is based on the second set of reference signals.

Aspect 19 is the method of aspect 18, where the method further includes receiving, from the UE, an indication for one or more of the first number of available antenna elements or the second number of selected antenna elements.

Aspect 20 is the method of any of aspects 18 to 19, wherein a first number of reference signals in the first set of reference signals is proportional to the first number.

Aspect 21 is the method of any of aspects 18 to 19, wherein a second number of reference signals in the second set of reference signals is proportional to the second number.

Aspect 22 is the method of any of aspects 18 to 21, where the method further includes receiving, from the UE, an indication of an intermediate number of antenna elements, wherein the intermediate number is less than the first number and greater than the second number; and transmitting, for the UE, an intermediate set of reference signals.

Aspect 23 is an apparatus for wireless communication at a network entity, comprising: a processing system that includes processor circuitry and memory circuitry that stores code and is coupled with the processor circuitry, the processing system configured to cause the network entity to perform the method of one or more of aspects 18-22.

Aspect 24 is an apparatus for wireless communication at a network entity, comprising: at least one memory; and at least one processor coupled to the at least one memory and, where the at least one processor, individually or in any combination, is configured to perform the method of any of aspects 18-22.

Aspect 25 is the apparatus for wireless communication at a network entity, comprising means for performing each step in the method of any of aspects 18-22.

Aspect 26 is an apparatus of any of aspects 23-25, further comprising a transceiver configured to receive or to transmit in association with the method of any of aspects 18-22.

Aspect 27 is a computer-readable medium (e.g., a non-transitory computer-readable medium) storing computer executable code at a network entity, the code when executed by at least one processor causes the at least one processor to, individually or in any combination, perform the method of any of aspects 18-22.

What is claimed is:

1. An apparatus for wireless communication at a user equipment (UE), comprising:
   at least one memory; and
   at least one processor coupled to the at least one memory and, based at least in part on information stored in the at least one memory, the at least one processor, individually or in any combination, is configured to cause the UE to:
      receive, from a network entity, a first set of reference signals associated with a first number of available antenna elements on the UE;
      select, based on the first set of reference signals, a second number of selected antenna elements from the first number of available antenna elements, wherein the second number is smaller than the first number; and
      communicate data via the second number of the antenna elements based on a set of beam weights, wherein the set of beam weights is based on a second set of reference signals generated based on the second number of selected antenna elements.

2. The apparatus of claim 1, further comprising a transceiver coupled to the at least one processor, wherein to receive the first set of reference signals, the at least one processor, individually or in any combination, is configured to cause the UE to receive the first set of reference signals via the transceiver, and wherein the at least one processor, individually or in any combination, is further configured to cause the UE to:
   transmit, to the network entity, an indication for one or more of the first number of available antenna elements or the second number of selected antenna elements.

3. The apparatus of claim 1, wherein the at least one processor, individually or in any combination, is further configured to cause the UE to:
   estimate, based on the first set of reference signals, a first covariance matrix associated with the first number of available antenna elements, and wherein to select the second number of selected antenna elements, the at least one processor, individually or in any combination, is configured to cause the UE to:
      select, based on the first covariance matrix, the second number of selected antenna elements.

4. The apparatus of claim 3, wherein to select, based on the first covariance matrix, the second number of selected antenna elements, the at least one processor, individually or in any combination, is configured to cause the UE to:
   determine, based on the first covariance matrix, a first eigenvector; and
   select, based on one or more coefficients associated with the first eigenvector, the second number of selected antenna elements.

5. The apparatus of claim 4, wherein to select the second number of selected antenna elements, the at least one processor, individually or in any combination, is configured to cause the UE to:
   identify, based on a magnitude of each of the one or more coefficients, the second number of coefficients from the one or more coefficients; and
   select, based on the second number of coefficients, the second number of selected antenna elements.

6. The apparatus of claim 1, wherein the at least one processor, individually or in any combination, is further configured to cause the UE to:
   determine the set of beam weights based on the second set of reference signals, wherein the communication of the data is based on the determined set of beam weights.

7. The apparatus of claim 6, wherein to determine the set of beam weights, the at least one processor, individually or in any combination, is configured to cause the UE to:
   estimate, based on the second set of reference signals, a second covariance matrix associated with the second number of selected antenna elements;
   compute a second eigenvector of the second covariance matrix; and
   determine, based on the second eigenvector of the second covariance matrix, the set of beam weights.

8. The apparatus of claim 1, wherein a first number of reference signals in the first set of reference signals is proportional to the first number.

9. The apparatus of claim 1, wherein a second number of reference signals in the second set of reference signals is proportional to the second number.

10. The apparatus of claim 1, wherein the at least one processor, individually or in any combination, is further configured to cause the UE to:
    estimate an intermediate covariance matrix associated with an intermediate number of antenna elements, wherein the intermediate number is greater than the second number and less than the first number, and wherein to select the second number of selected antenna elements from the first number of available antenna elements, the at least one processor, individually or in any combination, is configured to cause the UE to:
    select the second number of selected antenna elements from the intermediate number of antenna elements.

11. The apparatus of claim 10, wherein the at least one processor, individually or in any combination, is further configured to cause the UE to:
    transmit, for the network entity, an indication of the intermediate number of antenna elements.

12. The apparatus of claim 11, wherein the at least one processor, individually or in any combination, is further configured to cause the UE to:
    receive, for the network entity, an intermediate set of reference signals, wherein to estimate the intermediate covariance matrix associated with the intermediate number of antenna elements, the at least one processor, individually or in any combination, is configured to cause the UE to:

estimate, based on the intermediate set of reference signals, the intermediate covariance matrix associated with the intermediate number of antenna elements.

13. An apparatus for wireless communication at a network entity, comprising:

at least one memory; and at least one processor coupled to the at least one memory and, based at least in part on information stored in the at least one memory, the at least one processor, individually or in any combination, is configured to cause the network entity to:

transmit, to a user equipment (UE), a first set of reference signals associated with a first number of available antenna elements on the UE;

transmit, to the UE, a second set of reference signals generated based on a second number of selected antenna elements, wherein the second number is less than the first number; and communicate data via the second number of the antenna elements based on a set of beam weights, wherein the set of beam weights is based on the second set of reference signals.

14. The apparatus of claim 13, further comprising a transceiver coupled to the at least one processor, wherein to transmit the first set of reference signals, the at least one processor, individually or in any combination, is configured to transmit the first set of reference signals via the transceiver, and wherein the at least one processor, individually or in any combination, is further configured to cause the network entity to:

receive, from the UE, an indication for one or more of the first number of available antenna elements or the second number of selected antenna elements.

15. The apparatus of claim 13, wherein a first number of reference signals in the first set of reference signals is proportional to the first number.

16. The apparatus of claim 13, wherein a second number of reference signals in the second set of reference signals is proportional to the second number.

17. The apparatus of claim 13, wherein the at least one processor, individually or in any combination, is configured to cause the network entity to:

receive, from the UE, an indication of an intermediate number of antenna elements, wherein the intermediate number is less than the first number and greater than the second number; and transmit, for the UE, an intermediate set of reference signals.

18. A method of wireless communication at a user equipment (UE), comprising:

receiving, from a network entity, a first set of reference signals associated with a first number of available antenna elements on the UE;

selecting, based on the first set of reference signals, a second number of selected antenna elements from the first number of available antenna elements, wherein the second number is smaller than the first number; and communicating data via the second number of the antenna elements based on a set of beam weights, wherein the set of beam weights is based on a second set of reference signals generated based on the second number of selected antenna elements.

19. The method of claim 18, further comprising:

transmitting, to the network entity, an indication for one or more of the first number of available antenna elements or the second number of selected antenna elements.

20. The method of claim 18, further comprising:

estimating, based on the first set of reference signals, a first covariance matrix associated with the first number of available antenna elements, and selecting the second number of selected antenna elements comprises:

selecting, based on the first covariance matrix, the second number of selected antenna elements.

* * * * *